(12) United States Patent
Shepstone (10) Patent No.: US 11,736,554 B2
(45) Date of Patent: Aug. 22, 2023

(54) SYSTEM, METHOD AND COMPUTER PROGRAM PRODUCT FOR SMART UPLOAD AUTOMATION

(71) Applicant: Open Text SA ULC, Halifax (CA)

(72) Inventor: Lee Shepstone, Oxford (GB)

(73) Assignee: OPEN TEXT SA ULC, Halifax (CA)

( * ) Notice: Subject to any disclaimer, the term of this patent is extended or adjusted under 35 U.S.C. 154(b) by 0 days.

(21) Appl. No.: 17/484,866

(22) Filed: Sep. 24, 2021

(65) Prior Publication Data

US 2022/0014606 A1 Jan. 13, 2022

Related U.S. Application Data

(63) Continuation of application No. 17/094,672, filed on Nov. 10, 2020, now Pat. No. 11,283,904, which is a
(Continued)

(51) Int. Cl.

| | |
|---|---|
| *H04L 67/02* | (2022.01) |
| *H04L 67/01* | (2022.01) |
| *G06F 16/48* | (2019.01) |
| *G06F 16/958* | (2019.01) |
| *G06F 16/957* | (2019.01) |
| *H04L 67/06* | (2022.01) |

(Continued)

(52) U.S. Cl.
CPC ............ *H04L 67/01* (2022.05); *G06F 3/0484* (2013.01); *G06F 16/48* (2019.01); *G06F 16/958* (2019.01); *G06F 16/9577* (2019.01); *H04L 67/02* (2013.01); *H04L 67/06* (2013.01); *H04L 67/565* (2022.05); *G06F 15/16* (2013.01)

(58) Field of Classification Search
None
See application file for complete search history.

(56) References Cited

U.S. PATENT DOCUMENTS

| | | |
|---|---|---|
| 7,639,943 B1 | 12/2009 | Kalajan |
| 8,700,790 B1 | 4/2014 | Singh et al. |
| | (Continued) | |

OTHER PUBLICATIONS

Office Action issued for U.S. Appl. No. 13/248,168, dated Feb. 27, 2013, 17 pages.
(Continued)

*Primary Examiner* — James A Edwards
(74) *Attorney, Agent, or Firm* — Sprinkle IP Law Group (57) ABSTRACT

Systems, methods, and computer program products for smart upload automation in which actions are automatically performed on a set of digital assets against a target item. In one embodiment, a system includes a network, a server machine, a client machine and a data storage device, each of which is coupled to the network. The client machine designates digital assets and a target item against which the assets will be uploaded. The digital assets are uploaded by the client machine to the data storage device via the network. The server machine automatically performs actions on the digital assets without intervention by the client machine, where the actions are associated with or in some way defined by the target item. The actions may include setting metadata values of the digital assets based upon metadata associated with the target item, or generating different renditions of the digital assets.

21 Claims, 2 Drawing Sheets

Related U.S. Application Data continuation of application No. 15/864,864, filed on Jan. 8, 2018, now Pat. No. 10,863,001, which is a continuation of application No. 13/909,905, filed on Jun. 4, 2013, now Pat. No. 9,894,184, which is a continuation of application No. 13/248,168, filed on Sep. 29, 2011, now Pat. No. 9,043,387.

(60) Provisional application No. 61/387,909, filed on Sep. 29, 2010.

(51) Int. Cl.
   *G06F 3/0484* (2022.01)
   *H04L 67/565* (2022.01)
   *G06F 15/16* (2006.01)

(56) References Cited

U.S. PATENT DOCUMENTS

| | | | |
|---|---|---|---|
| 8,914,531 B2 | 12/2014 | Chiang | |
| 9,043,387 B2 | 5/2015 | Shepstone | |
| 9,894,184 B2 | 2/2018 | Shepstone | |
| 10,863,001 B2 | 12/2020 | Shepstone | |
| 2001/0056463 A1 | 12/2001 | Grady et al. | |
| 2002/0120939 A1 | 8/2002 | Wall | |
| 2003/0035138 A1* | 2/2003 | Schilling | G06Q 30/06 358/1.15 |
| 2003/0140090 A1 | 7/2003 | Rezvani et al. | |
| 2003/0161499 A1 | 8/2003 | Svendsen et al. | |
| 2003/0182359 A1* | 9/2003 | Vorchik | G06F 16/951 707/E17.108 |
| 2004/0003117 A1 | 1/2004 | McCoy et al. | |
| 2004/0205494 A1 | 10/2004 | Bernius et al. | |
| 2004/0250205 A1 | 12/2004 | Conning | |
| 2005/0080872 A1 | 4/2005 | Davis et al. | |
| 2007/0073776 A1 | 3/2007 | Kalalian et al. | |
| 2007/0124416 A1* | 5/2007 | Casey | H04L 67/55 709/217 |
| 2007/0157252 A1 | 7/2007 | Perez | |
| 2007/0168543 A1 | 7/2007 | Krikorian et al. | |
| 2007/0219923 A1 | 9/2007 | Shea et al. | |
| 2007/0276862 A1 | 11/2007 | Toutonghi | |
| 2009/0006260 A1 | 1/2009 | Mishra | |
| 2009/0037967 A1* | 2/2009 | Barkan | H04N 21/6582 725/105 |
| 2009/0125570 A1 | 5/2009 | Bailey et al. | |
| 2009/0164606 A1 | 6/2009 | Epifania | |
| 2010/0251352 A1 | 9/2010 | Zarchy et al. | |
| 2010/0257446 A1 | 10/2010 | Woolfe et al. | |
| 2010/0325211 A1 | 12/2010 | Ylinen et al. | |
| 2011/0087666 A1 | 4/2011 | Chou et al. | |
| 2012/0133772 A1 | 5/2012 | Ortiz | |
| 2013/0165086 A1 | 6/2013 | Doulton | |
| 2014/0108552 A1 | 4/2014 | Singh et al. | |
| 2021/0058494 A1 | 2/2021 | Shepstone | |

OTHER PUBLICATIONS

Office Action for U.S. Appl. No. 13/248,168, dated Jul. 22, 2013, 28 pages.
Office Action for U.S. Appl. No. 13/248,168, dated Aug. 25, 2014, 29 pages.
Office Action for U.S. Appl. No. 13/909,905, dated Apr. 22, 2015, 17 pages.
Office Action for U.S. Appl. No. 13/909,905, dated Oct. 13, 2015, 23 pages.
Office Action for U.S. Appl. No. 13/909,905, dated Apr. 6, 2016, 21 pages.
Office Action for U.S. Appl. No. 13/909,905, dated Sep. 14, 2016, 23 pages.
Office Action for U.S. Appl. No. 13/909,905, dated Apr. 10, 2017, 26 pages.
Office Action for U.S. Appl. No. 15/864,864, dated Nov. 6, 2019, 17 pages.
Office Action for U.S. Appl. No. 15/864,864, dated Apr. 6, 2020, 24 pages.
Office Action for U.S. Appl. No. 17/094,672, dated Jun. 29, 2021, 24 pages.

* cited by examiner

SYSTEM, METHOD AND COMPUTER PROGRAM PRODUCT FOR SMART UPLOAD AUTOMATION

CROSS-REFERENCE TO RELATED APPLICATION(S)

This application is a continuation of U.S. patent application Ser. No. 17/094,672, filed Nov. 10, 2020, now U.S. Pat. No. 11,283,904, which is a continuation of U.S. patent application Ser. No. 15/864,864, filed Jan. 8, 2018, now U.S. Pat. No. 10,863,001, which is a continuation of U.S. patent application Ser. No. 13/909,905, filed Jun. 4, 2013, now U.S. Pat. No. 9,894,184, which is a continuation of U.S. patent application Ser. No. 13/248,168, filed Sep. 29, 2011, now U.S. Pat. No. 9,043,387, which is a conversion of and claims a benefit of priority from Provisional Application No. 61/387,909, filed Sep. 29, 2010, all of which are incorporated by reference herein as if set forth in their entireties.

COPYRIGHT NOTICE

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

TECHNICAL FIELD

This disclosure relates generally to content management. More particularly, embodiments disclosed herein relate to a system, method, and computer program product for smart upload automation useful for managing content items that may be associated with one or more network sites.

BACKGROUND

Advances in information technology continue to bring challenges to content management, particularly in the context of Web site content management, but generally to content management of any kind. In certain industries such as communications, media, and entertainment industries, it can be vitally important to provide rich content to their site visitors. The integration of rich content into Web sites, particularly enterprise Web sites, may present many challenges.

As an example, a user may create a large number of digital assets and may wish to submit them for publication on a Web site. In some cases, it may be desired to minimize the time between the submission of these digital assets and the publication thereof. A specific example may be that a news reporter is reporting live from an award show and has hundreds of images and/or videos to publish on his company's website. Conventionally, he may select and upload his files to a designated network address, usually a repository or a directory where the files can be stored. A reviewer may then review the files uploaded by the report and approve or disapprove the content for publication. If the content is approved, it may be necessary to manually associate data (metadata) with the files, convert the files into forms that are suitable for various purposes (e.g., lower resolution copies, previews, etc.), or perform other actions to prepare the content for use.

SUMMARY

Embodiments disclosed herein provide systems, methods, and computer program products for smart upload automation. Particularly, in some embodiments, a software tool may enable a user to associate a number of content items with metadata or perform other actions automatically. For example, to upload a number of photos, a user can automatically associate the metadata that is common to all of those photos to all of them at once.

One embodiment comprises a system for performing smart uploads. The system includes a network, a server machine, a client machine and a data storage device, each of which is coupled to the network. The client machine is configured to designate one or more digital assets to be uploaded and a target item against which the assets will be uploaded. The digital assets are uploaded by the client machine to the data storage device via the network. The server machine is configured to automatically perform one or more actions on the digital assets without intervention by the client machine, where the actions are associated with or in some way defined by the target item. The actions may include, for example, setting metadata values of the digital assets based upon metadata associated with the target item, or generating different renditions of the digital assets and associating each of the renditions with a corresponding one of the digital assets.

The client machine may receive user input designating the target item and the digital assets while the client machine is disconnected from the network, the data storage device and/or the server machine. When the client machine is reconnected to the system, it will upload the digital assets and the server machine will automatically perform the actions on the digital assets. The system may be capable of asynchronously performing a first upload of a first set of digital assets against a first target item and a second upload of a second set of digital assets against a second target item. The system may be capable of simultaneously performing a first upload of a first set of digital assets against a first target item and a second upload of a second set of digital assets against a second target item.

Another embodiment comprises a method for uploading digital assets. The method includes designating a target item stored in a data storage device, designating one or more digital assets stored in a client machine, and performing a smart upload of the one or more digital assets from the client machine to the data storage device. In the smart upload, the client machine transmits the digital assets to the data storage device and a server machine automatically performs one or more actions on the one or more digital assets, where the one or more actions are associated with or in some way defined by the target item.

The actions may, for instance, comprise setting metadata values of the digital assets based upon metadata associated with the target item. A user may be presented with a set of default metadata values taken from the target item. The user may change or accept the default values, and the smart upload is performed using the accepted metadata values. The actions may also consist of, for example, generating different renditions of the digital assets. The renditions may be associated with the corresponding ones of the digital assets. The designation of the target item, the digital assets and the actions to be performed may be performed by a client machine while the client machine is disconnected from the storage device and the server machine, in which case the upload of the digital assets is performed when the client machine is reconnected to the storage device and the server machine. A first smart upload of a first set of digital assets against a first target item and a second smart upload of a second set of digital assets against a second target item are performed asynchronously or simultaneously.

Yet another alternative embodiment may comprise a computer program product. This product includes a computer-readable medium that stores one or more instructions that are executable by a computer to perform a method as described above.

In some alternative embodiments, various actions are performed on digital assets against a target item, apart from an upload of the assets. In one such embodiment, a system includes a server machine and a data storage device. The server machine is configured to enable a user to designate a target item, one or more digital assets, and one or more actions. The server machine then performs the actions on each of the digital assets, wherein the one or more actions are associated with or in some way defined by the target item. The actions may include, for example, setting metadata values of each of the digital assets based upon metadata associated with the target item, or generating different renditions of each of the digital assets.

Another alternative embodiment comprises a method for performing actions on digital assets against a target item, apart from an upload of the assets. The method includes designating a target item, designating one or more digital assets stored in a storage device, designating one or more actions, performing the one or more actions on each of the one or more digital assets, wherein the one or more actions are associated with or in some way defined by the target item. Yet another alternative embodiment may comprise a computer program product. This product includes a computer-readable medium that stores one or more instructions that are executable by a computer to perform a method for performing actions on digital assets against a target item, apart from an upload of the assets as described above.

Numerous other alternative embodiments are also possible.

BRIEF DESCRIPTION OF THE DRAWINGS

A more complete understanding of the disclosure and the advantages thereof may be acquired by referring to the following description, taken in conjunction with the accompanying drawings in which like reference numbers indicate like features and wherein.

The drawings accompanying and forming part of this specification are included to depict certain aspects of the disclosure. It should be noted that the features illustrated in the drawings are not necessarily drawn to scale.

DETAILED DESCRIPTION OF EXEMPLARY EMBODIMENTS

The disclosure and various features and advantageous details thereof are explained more fully with reference to the exemplary, and therefore non-limiting, embodiments illustrated in the accompanying drawings and detailed in the following description. Descriptions of known programming techniques, computer software, hardware, operating platforms and protocols may be omitted so as not to unnecessarily obscure the disclosure in detail. It should be understood, however, that the detailed description and the specific examples, while indicating the preferred embodiments, are given by way of illustration only and not by way of limitation. Various substitutions, modifications, additions and/or rearrangements within the spirit and/or scope of the underlying inventive concept will become apparent to those skilled in the art from this disclosure.

Software implementing embodiments disclosed herein may be implemented in suitable computer-executable instructions that may reside on a computer-readable storage medium. Within this disclosure, the term "computer-readable storage medium" encompasses all types of data storage medium that can be read by a processor. Examples of computer-readable storage media can include random access memories, read-only memories, hard drives, data cartridges, magnetic tapes, floppy diskettes, flash memory drives, optical data storage devices, compact-disc read-only memories, and other appropriate computer memories and data storage devices.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead these examples or illustrations are to be regarded as being described with respect to one particular embodiment and as illustrative only. Those of ordinary skill in the art will appreciate that any term or terms with which these examples or illustrations are utilized encompass other embodiments as well as implementations and adaptations thereof which may or may not be given therewith or elsewhere in the specification and all such embodiments are intended to be included within the scope of that term or terms. Language designating such non-limiting examples and illustrations includes, but is not limited to: "for example," "for instance," "e.g.," "in one embodiment," and the like.

Figure 1:
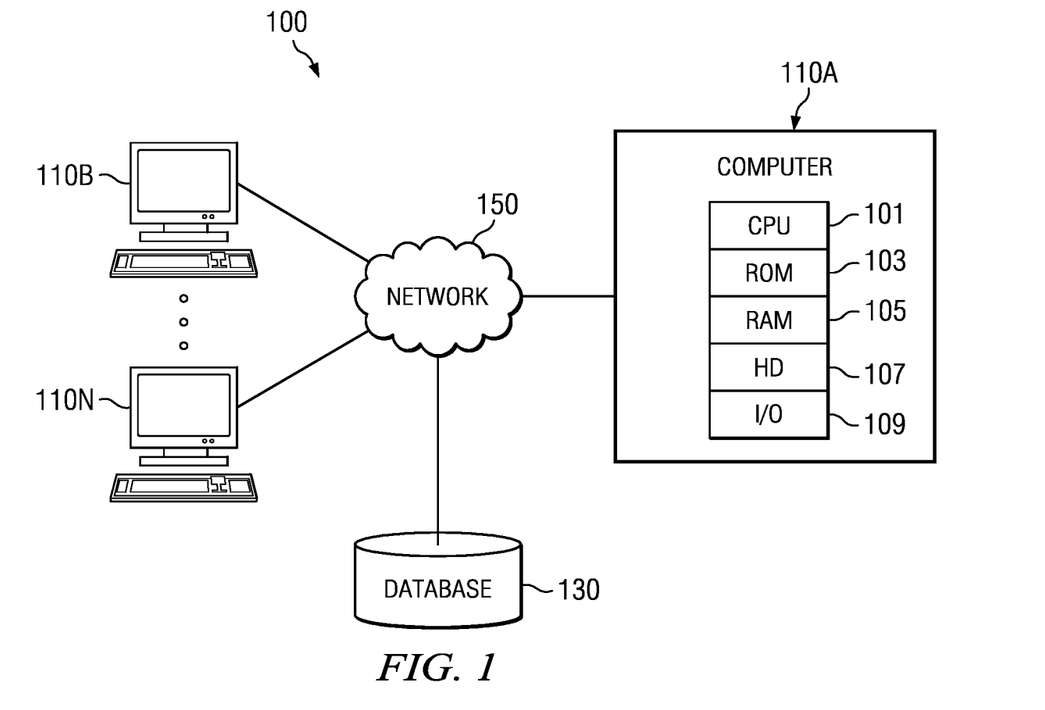
FIG. 1 is a diagrammatic representation of an overall architecture wherein some embodiments disclosed herein may be implemented.

FIG. 1 depicts a simplified network architecture for an example computing environment where embodiments disclosed herein may be implemented. As one skilled in the art can appreciate, the exemplary architecture shown and described herein with respect to FIG. 1 is meant to be illustrative and not limiting.

In FIG. 1, computing environment 100 may comprise network 150. Network 150 may be characterized as an internal network. Network 150 may include or be connected to an external network. The Internet might be an example of an external network and a company's intranet might be an example of an internal network. Each network can be bi-directionally coupled to a variety of networked systems, devices, repositories, etc.

In the simplified configuration shown in FIG. 1, network 150 is bi-directionally coupled to a plurality of computers and/or machines 110A-N. Computers 110A-N may comprise at least a server machine and a client machine. Virtually any piece of hardware or electronic device capable of running client software and communicating with a server can be considered a client machine. As an example, computer 110A may include a central processing unit (CPU) 101, read-only memory (ROM) 103, random access memory (RAM) 105, hard drive (HD) or non-volatile memory 107, and input/output (I/O) device(s) 109. An I/O device may be a keyboard, monitor, printer, electronic pointing device (e.g., mouse, trackball, etc.), or the like. The hardware configuration of computer 110A can be representative of other devices and computers coupled to network 150 (e.g., desktop computers, laptop computers, personal digital assistants, handheld computers, cellular phones, and any electronic devices capable of storing and processing information and network communication). Computer 110B may connect to database 130 and computer 110A via network 150. Database 130 may store data used by the system to monitor computing environment 100, as well as target and asset items. In some embodiments, computer 110B may send results to computer 110A over network 150 and computer 110A may operate to present the results to a user of computer 110A.

Embodiments disclosed herein may be implemented in a system (e.g. as described in connection with FIG. 1), in a method (e.g., as described below in connection with FIG. 2), or in suitable software including computer-executable instructions. As one skilled in the art can appreciate, a computer program product implementing an embodiment disclosed herein may comprise one or more non-transitory computer readable storage media storing computer instructions translatable by one or more processors in computing environment 500. Examples of computer readable media may include, but are not limited to, volatile and non-volatile computer memories and storage devices such as ROM, RAM, HD, direct access storage device arrays, magnetic tapes, floppy diskettes, optical storage devices, etc. In an illustrative embodiment, some or all of the software components may reside on a single server computer or on any combination of separate server computers.

Figure 2:
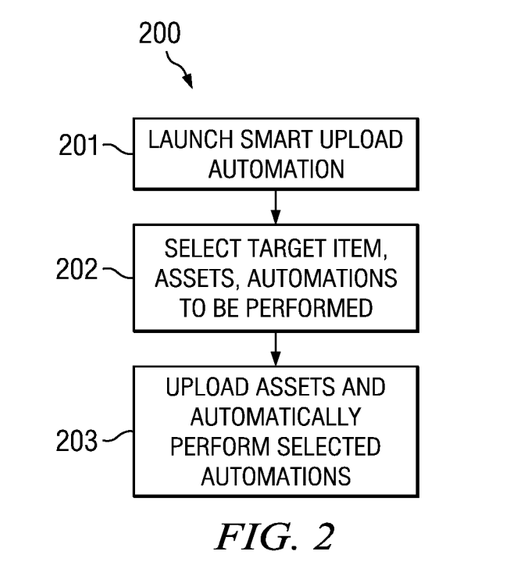
FIG. 2 depicts a flow diagram illustrating one example embodiment of a method for smart upload automation.

FIG. 2 depicts a flow diagram illustrating one example embodiment of method 200 for smart upload automation to upload a number of digital assets. Examples of digital assets may include images, videos, podcasts, Rich Internet Application (RIA) components, etc. Within this disclosure, the execution of smart upload automation involves at least two items: an existing item (also referred to herein as the target item) residing at a network site and a new item (also referred to herein as a digital asset, asset, or simply item) to be uploaded against the target item.

Figure 3:
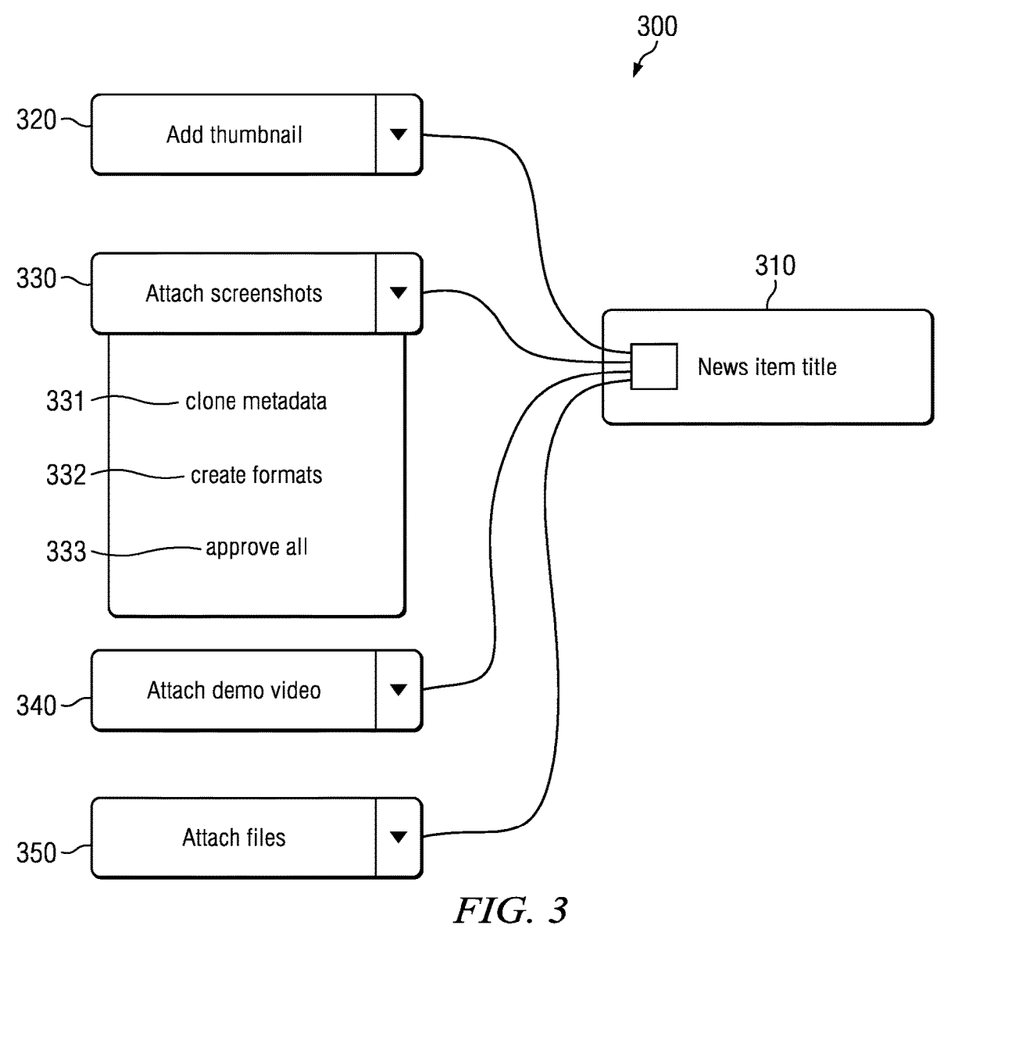
FIG. 3 depicts an example interface for smart upload automation.

At step 201, a user may launch a Smart Upload software tool. At step 202, the user selects a target item, one or more assets, and an automation (a task or set of tasks) that will be performed on the assets against the target item. That is, the automation is associated with, or in some way defined by the target item. In one embodiment, the user may launch the smart upload tool with respect to a target item, such as a news item. This will cause a user interface such as is illustrated in FIG. 3 to be displayed to the user. The interface graphically displays an icon 310 for the target item, as well as icons (320, 330, 340, 350) for several automations that may be performed in conjunction with a smart upload against the target item. Some of the automations may have sub-tasks that can be performed as part of the automation. For instance, under the "attach screenshots" automation (330), there are sub-tasks that include "Clone metadata" (331), "Create formats" (332), and "Attach files" (333).

In this embodiment, the user may select assets to be uploaded, and select the automation to be performed on the assets, by dragging and dropping the asset(s) directly onto one of the automation menu items displayed on the interface of the Smart Upload tool. For instance, a user may wish to upload a screenshot image to a news channel. By dropping the screenshot image file onto the "Attach Screenshots" automation item, this digital asset item is attached to or associated with the target item (in this example the news channel) automatically.

In some embodiments, the user may be prompted to enter and/or select some values which can be dynamically set to either the asset or the target item. For example, upon selecting the target item and the assets, the smart upload tool may present the user with a list of metadata values to be set for the assets, where the values are set by default to the corresponding values associated with the target item. The user may accept these default values, or enter different values. When the assets are uploaded, the smart upload tool will set the metadata values for the assets as selected by the user or perform such other automations as may have been selected by the user (step 203). In some embodiments, these values may represent constraint(s) to be applied to the asset. In another example, the user may set a value or characteristic of the target item. For instance, the target item may be set to use an uploaded asset as a background image.

Some embodiments of the smart upload functionality disclosed herein may execute a plurality of tasks, including content task, assign as asset task, assign categories task, set metadata task, assign channels task, and assign tags task in conjunction with the upload of assets for a more flexible usage in the smart upload automation.

With smart upload automation, one or more assets are uploaded with respect to the existing media item (a non asset) referred to herein as a target item. In this context, the smart upload functionality may be utilized to perform update automation on the existing target item, in addition to uploading an asset and performing upload type automation on the item being uploaded. An example of an automation with respect to the asset is producing a thumbnail, or transcoding a high-res video to have a low-resolution equivalent for quick reviews, or normalizing the transcoding of videos into H.264 format.

With respect to the target item, for instance, a user can upload an image and set it as a background image to an existing album. A user can also upload multiple videos (or advanced videos, images, podcasts, RIA components, etc.) and set them as Media Associations to an album or any other target item, or even set them as elastic metadata to the existing target item. In this way, a user may upload 'like' assets and automatically apply metadata, classification or related data to those assets. In some embodiments, the smart upload automation can reduce the number of clicks (manual initiation of tasks that act on the items) by a factor of 5-10× over conventional upload methodologies.

In some embodiments, a smart upload automation system disclosed herein may include a pluggable storage module. This pluggable storage module may handle, among other things, load balancing for the system with respect to storing data being uploaded. This allows a user to complete a task at hand with confidence that the system will get the data, even if the cloud storage may be actually closer to the user than the system (i.e., even if the system may not receive all the data in real time).

The foregoing description is directed to an embodiment that implements drag-and-drop functionality to facilitate use of the system by non-technical persons. Alternative embodiments may implement other types of user interfaces. For example, one embodiment may, upon launching smart upload functionality, present the user with a prompt or display that prompts the user to identify target items and assets using dialog boxes, drop-down menus or the like. The available upload automations may be presented in a graphical format similar to the one shown in FIG. 3, or they may be selected through dialog boxes, drop-down menus or the like, in the same manner as the target and asset items.

The smart upload system may be implemented in a hardware system similar to that described in connection with FIG. 1. In one embodiment, one of computers 110 may function as a client machine, while another of computers 110 functions as a server machine. In this embodiment, a user employs the client machine to interface with the server machine and to designate the target items, assets and desired automations for the smart upload. The smart upload is launched on the client machine, which uploads the assets via the network. The server machine controls the storage of the assets on the database and performs the designated automations on the assets.

After the user designates the target, assets and automations, and initiates the smart upload, the user does not need to intervene in the process or take any further action, as the process (including setting metadata, generating alternative renditions of the assets, or any other designated tasks) is carried out by the server machine. In fact, the interaction between the client and server machines may be asynchronous. In other words, the client machine may initiate a first smart upload, and then initiate another before the first is complete. When the server machine completes the first smart upload, it will begin the second. If there are multiple pending smart uploads, the server machine will perform each one in turn after it completes the preceding one. The client machine may also initiate one or more smart uploads when it is offline (i.e., disconnected from the network and/or from the server machine). When the connection of the client to the network and server machine is established, the server machine will proceed to perform the smart upload procedures as determined by the client machine.

The server machine may also be capable of performing automations on designated assets, apart from the actual upload of the assets. For instance, one or more assets may be uploaded with the server machine performing a first automation on the assets, such as generating a rendition of each asset according to a particular common format. The user who uploaded the assets may later realize that it will be necessary to have renditions of the assets in a second, lower-resolution format. The user can direct the server machine to perform an automation to generate the lower-resolution renditions of the assets without having to upload the assets a second time. The second automation may be carried out in essentially the same manner as the original smart upload, with the designation of a target item, the selected assets, and the desired automation. The user may be presented with default values or other options for the automation in the same manner as the smart upload.

A sample smart upload automation is described in detail below.

Sample Smart Upload Automation

The following simple automation xml may help in understanding the smart upload.

```
<automation>
    <tasks>
        <contenttask id="#{item.id}" >
            <setmetadata description="desc">
                <metadata valueexpr="#{targetItem.attr.BACKGROUNDIMAGE=item.id}"/>
            </setmetadata>
            <assignchannels description="desc" value="#{targetItem.channels}"/>
        </contenttask>
    </tasks>
</automation>
```

This example automation is trying to set the item being uploaded as back ground image to the existing target item using the 'setmetadata' task. It is also trying to set channels to the item being uploaded by getting the channels from the target item. The content task shown in the example acts as a wrapper task and contains sub tasks. More details about the setmetadata, assigning channels and content task can be found in the corresponding sections below.

Input Prompts with Smart Upload and Upload

The purpose of using input prompts is to allow a user to enter/select some values which can be dynamically set to either the item or target item (in case of smart upload only) as part of the automation. In some embodiments, each of the prompts in the <input> tag represents a user input prompt. The following example has two prompts.

```
<automation>
    <input>
        <prompt title='Related Products for Asset' required="false" default="" name="prompt_productlist">
            <control type='advancedcontentpicker' allowmultipleitemselection="true" valuefield="id" titlefield="title"
typefield="mediatype" classfield="mediaclasstype" localefield="locale"
modifiedonfield="modifiedon"
thumbnailurifield="thumbnailuri" itemstatusfield="statusid" itemdomainfield="domain"
itemrefcategoryfield="refcategory" mediatypes='product'
filterdataservice='/xapi/xml/listAllCIs'
searchdataservice='/xapi/xml/listAllCIs'
tagdataservice='/xapi/xml/displayTagSearch'
shelfdataservice='/xapi/xml/ShelfFilterDetails'
autocompleteurl="http://suggestqueries.google.com/complete/search"/>
```

```
        <help>Select multiple Products . . . </help>
    </prompt>
    <prompt title="Platforms" required="false" default="" name="prompt_platformlist">
        <control type="advancedreferencepicker" allowmultipleitemselection="false" valuefieldId="refid" titlefield="refname" descriptionfield="description" dataservice="/xapi/xml/listRefData?requestFor=variationtype" autocompleteurl="http://suggestqueries.google.com/complete/search"/>
            <help>Select Platforms . . . </help>
        </prompt>
    </input>
    <tasks>
      <contenttask id="#{item.id}" >
        <setmetadata description="desc">
            <metadata valueexpr="#{targetItem.attr.PACKART=item.id}">
            <metadata valueexpr="#{item.elastic.classifications.platforms=input.prompt_platformlist}"/>
            <metadata valueexpr="#{item.elastic.content.products=input.prompt_productlist}">
            <metadata valueexpr="#{targetItem.elastic.content.crosssell=input.prompt_productlist}">
        </setmetadata>
      </contenttask>
    </tasks>
</automation>
```

In this example automation, there are two user prompts. One with title 'Related Products for Asset' and another with title 'Platforms'. In some embodiments, the prefix "prompt_" may be used for all the prompt names.

In some embodiments, while performing the smart upload or normal upload, when this automation is selected by a user, the user is prompted to pick Products and Platforms. In some embodiments, these values are referred (by names prompt_platformlist and prompt_productlist) in the set metadata task in the automation to set the values as platforms and products to the item being uploaded and these values are set to the corresponding elastic metadata once the automation is completed.

In some embodiments, these values may be set to the item using 'input.' (input with a dot notation as a separator, followed by the prompt name.Ex input.prompt_platformlist.) In some embodiments, it may be up to an administrator who creates the automation to make sure that the prompted values are set to the appropriate attributes or to the appropriate elastic metadata. Example attributes may include PACKART and BACKGROUNDIMAGE which use an image and not Video or other types.

Set Metadata Task

In some embodiments, this task includes an attribute called valueexpr in the metadata tag. This task can use either a legacy name and value attributes or use the valueexpr attribute. In this case, the valueexpr attribute should be used when the automation is trying to set the values from context either to the item or to the target item.

```
<metadata
    valueexpr="#{targetItem.att.BACKGROUND-
    IMAGE=item.id}"/>

<metadata
    valueexpr="#{item.attr.RANKING=targetItem.attr.
    RANKING}"/>

<metadata
    valueexpr="#{item.attr.STATUSID=input.prompt_status}"/>
```

In these examples, the first expression updates the target Item, so 'targetItem' is used in left side of the expression. The expression "#{targetItem.attr.BACKGROUND-IMAGE=item.id}" sets the item that is being uploaded as the background image of the target item. To update the asset item with values from the target item, 'item' is used in left side of the expression and 'targetItem' is used in the right side of the expression.

As mentioned before, the term 'item' is used to refer to the item being uploaded. The first expression tries to set the item (using its id) as the background image of the target item. With the expression "#{item.attr.RANKING= targetItem.attr.RANKING}", the item is set to the same ranking as that of ranking of the target item. This type of expression may assign a value which is pre-existing in the target item (in the context) as an attribute of the item being uploaded. With the expression "#{item.attr.STATUSID=input.prompt_status}", the item may be set to a status which is picked by the user while uploading the item, provided the prompt with name 'prompt_status' is present in the automation. Here, the 'input.' notation is used to refer to the values set through user prompt.

The following example depicts an incorrect usage of metadata expression. This expression is improperly trying to set the values from the item (which is not yet uploaded and is not present in the context) to the target item

```
<metadata
    valueexpr="#{targetItem.attr.RANKING=item.attr.
    RANKING}"/>
```

In some embodiments, the usage of 'valueexpr' in metadata tag may be allowed only when the set metadata task is used in content task. The usage of 'targetItem' in 'valueexpr' may, in some embodiments, be allowed only as part of the content task and only in the smart upload type of automation. In the above expressions, wherever a target item is used, it is assumed that the expression pertains to a smart upload automation.

A normal upload does not have any target item in the context. More specifically, with a normal upload, the same automation can be used but without any reference to target item. The legacy set metadata task with name and value attributes in the metadata tag can be used to set hard coded values only on the item being uploaded. This can be used as a sub task in content task, or outside even the content task.

Updating Top Relation Data

In some embodiments, the following expression can be used to set top relation data.

```
#{item.attr.<ATTRIBUTE XML
    NAME>=targetItem.attr.<ATTRIBUTE XML
    NAME>}
```

For example, "#{item.attr.RANKING=targetItem.attr.RANKING}" will set the ranking value of the item to the ranking value of the target item. In this case, the attribute name is the XML name of the attribute as defined in the content type definition (CTD). It should be noted that the "attr." before RANKING is used to refer to attributes on top relation and can be used only for attributes on the top relation of the CTD.

Updating Elastic Metadata

"Elastic metadata" refers to metadata that can accommodate different types of content and reference data. Media content can have "facets" that allow a user to retrieve content or reference data using various, different finders, and to display the retrieved content or data in various formats or views. To update elastic metadata of an item, its facet id and the type of association needs to be used instead of the attribute names of the content type definition. Below are three examples which depict three scenarios of using automation to set elastic metadata.

1. Setting elastic metadata from user prompts.

Consider an example with the following facet definition on Image content type.

```
<association type="classifications" name="Classification">
    <facet id="genres" name="Genres" relationType="isAbout"
control="SmartReferenceMultiSelect">
        <criteria field="type" value="richmedia"/>
        <criteria field="class" value="genre"/>
        <order field="title" direction="asc"/>
    </facet>
    <facet id="platforms" name="Platforms" relationType="isAbout"
control="SmartReferenceMultiSelect">
        <criteria field="type" value="richmedia"/>
        <criteria field="class" value="platforms"/>
        <order field="title" direction="asc"/>
    </facet>
</association>
```

To update the platforms facet of the image from user prompt 'prompt_platformlist' the following expression should be used:

```
#{item.elastic.classifications.platforms=input.prompt_
    platformlist}"/>
```

This will add the platforms picked by the user in the user prompt to the platforms facet of the item.

In the above expression,

'item' refers to the item being upload

'elastic' indicates elastic data

'classifications' refers to the association type (content, classifications and targeting are allowed values)

'platforms' refers to the facet id from the facet definition.

2. Setting elastic metadata from target item to item.

In this example, elastic metadata may be set from the target item's facet to the item's facet. It may be important for an administrator to check the facet definitions of both the items before proceeding to create this kind of automation. More specifically, the administrator should check that the facet definitions need to match in the sense that both should have same criteria, and hence give same results.

As a specific example, the following facet definitions are for Image and Album respectively:

```
<association type="content" name="Related Content">
    <facet id="products" name="Products" relationType="isAbout"
control="SmartMediaClassificationMultiSelect">
        <criteria field="type" value="product"/>
        <order field="title" direction="asc"/>
    </facet>
</association>
<association type="content" name="Related Content">
```

-continued

```
    <facet id="upsell" name="Up Sell" relationType="isSecondaryTo"
control="SmartMediaContentMultiSelect">
        <criteria field="type" value="product"/>
        <order field="title" direction="asc"/>
    </facet>
</association>
```

The below expression could be used to set products from an Album (target item) to an Image (item).

```
#{item.elastic.content.products=targetItem.elastic.
    content.upsell}"/>
```

When using this kind of assignment, care should be taken while creating the automation, as the target item could have a different facet definition from that of the item, resulting in inconsistent values being set through the automation to the item.

3. The following example demonstrates an incorrect usage of setting elastic metadata through automation.

Consider the following facet definition of 'genres' for image and album respectively.

```
<facet id="genres" name="Genres" relationType="isAbout"
control="SmartReferenceMultiSelect">
    <criteria field="type" value="richmedia"/>
    <criteria field="class" value="genre"/>
    <order field="title" direction="asc"/>
</facet>
<facet id="genres" name="Genres" relationType="isAbout"
control="SmartReferenceMultiSelect">
    <criteria field="type" value="product"/>
    <criteria field="class" value="genre"/>
    <order field="title" direction="asc"/>
</facet>
```

Also assume an automation has the following expression in the setmetadata task.

```
#{item.elastic.classifications.genres=targetItem.elastic.classifi-
    cations.genres}"/>
```

In this case, the criteria do not match for the above facet definitions with respect to the 'type' criterion. If the album has some genres that are not applicable to the richmedia type, this automation will result in incorrect values being set to the Image item's genres.

Setting Custom Attributes

In some embodiments, custom attributes of the item and the target item can be set using the Set Metadata task.

For creating an automation with custom attributes, an administrator needs to be aware of the configuration performed for custom attributes in a particular content type.

```
<automation>
  <tasks>
   <contenttask id="#{item.id}" >
       <setmetadata description="desc">
           <metadata valueexpr="#{item.customattr.contained.TITLE='updated title'}"/>
           <metadata valueexpr="#{item.customattr.physical.TITLE='new title'}"/>
           <metadata valueexpr="#{item.customattr.physical.DateSelector='Aug-22-2009 15:05:38'}">
           <metadata valueexpr="#{targetItem.customattr.contained.TITLE='updated title'}"/>
           <metadata valueexpr="#{targetItem.customattr.contained.SelectChoice='value1'}">
           <metadata valueexpr="#{targetItem.customattr.physical.TITLE='updated title2'}">
           <metadata valueexpr="#{targetItem.customattr.physical.CheckboxChoice='value1'}"/>
           <metadata valueexpr="#{targetItem.customattr.physical.DateSelector='Aug-22-2009 15:05:38'}">
           <metadata valueexpr="#{item.customattr.contained.CheckboxChoice=targetItem.customattr.contained.CheckboxChoice}"/>
       </setmetadata>
   </contenttask>
  </tasks>
</automation>
```

Example 1

Consider the node <metadata valueexpr="#{item.customattr.contained.TITLE='updated title'}"/>. This expression will set the value "updated title" to the TITLE attribute of the item.

In this valueexpr,

'customattr' indicates custom attributes.

'contained' indicates the type of custom attributes. This should be either 'contained' or 'physical'.

'TITLE' indicates the attribute XML name of one of the defined attributes in the configuration.

Example 2

```
<metadata
    valueexpr="#{targetItem.customattr.physical.DateSelector='Aug-22-2009 15:05:38'}"/>
```

The above expression sets the date value to the DateSelector attribute of the physical custom attributes.

This expression sets the value of the 'CheckboxChoice' from the target item to the same attribute of the item.

Content Task

The content task acts as a wrapper task which can have sub tasks under it. The difference brought in by introducing Content task is to perform all the sub tasks, and then commit the instance, as opposed to top level tasks which are loaded and committed individually for each of the tasks. This makes a huge performance difference in the automation execution.

The following tasks can be part of content task:

Assign channels

Assign categories

Assign Tags

Set Project

Set media status

Set metadata

Approve Item

Assign As Asset

A sample automation with content task looks like this

```
<tasks>
<contenttask id="#{item.id}" >
       <setmetadata description="desc">
           <metadata valueexpr="#{targetItem.attr.BACKGROUNDIMAGE=item.id}"/>
       </setmetadata>
       <assignchannels description="desc" value="#{targetItem.channels}">
           <channel>myPlanet/Home/Two</channel>
       </assignchannels>
       <assignTags tags="#{targetItem.tags}" description="desc"/>
       <approveItem desc="some desc"/>
   </contenttask>
       <assigncategories id="#{item.id}" description="desc" value="#{targetItem.categories}">
           <category>myCategory/One</category>
       </assigncategories>
       <assignAsAsset contentitem="#{item.id}" reltype="assetreltype.main" caption="caption" description="desc"/>
</tasks>
```

Example 3

```
<metadata valueexpr="#{item.customattr.contained.CheckboxChoice=targetItem.customattr.contained.CheckboxChoice}"/>
```

The content task just takes the id value (which in one embodiment may be required) as an attribute. The sub tasks pick up this id value and perform automation on that item (and hence in one embodiment the sub tasks do not need an id attribute on them).

In the above automation, set metadata, assign channels and assign tags may be performed as sub tasks of content task, there by loading/committing the instance only once.

In one embodiment, Assign categories and Assign as asset tasks may be performed separately, there by loading the item and saving for each task.

In one embodiment, the target item id should not be used in the content task's id attribute.

Assign as Asset

This task sets the item (being uploaded) or items picked from user prompt as Media Associations to the target item.

```
<assignAsAsset contentitem="#{item.id}" reltype="assetreltype.main" caption="caption"
description="desc"/>
<assignAsAsset contentitem="#{input.prompt_assets}" reltype="assetreltype. main"
caption="caption" description="desc"/>
```

The above task sets the item being uploaded to the target item, whereas the second one sets the assets that are selected through user prompts (provided the prompt with name 'prompt_assets' is in the automation). In this example, the reltype attribute is used to set the Asset relation type on the association and caption attribute is used to set caption.

Assign Channels

The Assign channels task has a 'value' attribute which helps in assigning the same channels as that of the target item, to the item being uploaded.

```
<assignchannels description="desc" value="#{targetItem.channels}">
<channel>myPlanet/Home/One</channel>
<channel>myPlanet/Home/Two</channel>
</assignchannels>
```

In this example, the 'value' attribute is used to refer to the target item's channels. This example task therefore adds the target item channels and the channels given in the channel tags below it to the item being uploaded.

Either the 'value' attribute on 'assignChannels' tag or the 'channel' nodes inside it must be present for the task to work. Alternatively, both can be used.

Assign Categories

This task assigns categories to the item. The syntax is similar to the assign channels task described above. The category nodes within the 'assigncategories' element are used to assign categories with hard coded values. This can be used in normal upload, smart upload, update and create automations.

```
<assigncategones description="desc" value="#{targetItem.categories}">
<category>/Sports/Cricket/TestMatch</category>
<category>/Sports/Cricket/2020</category>
</assigncategories>
```

In this case, the 'value' attribute is used to refer to the target item's categories. This task adds the target item's categories and the categories given in the category nodes below it to the item being uploaded. Either the 'value' attribute on 'assigncategories' tag or the 'category' nodes inside it should be present for the task to work. Both can be used for the same task.

Although the foregoing specification describes specific embodiments, numerous changes in the details of the embodiments disclosed herein and additional embodiments will be apparent to, and may be made by, persons of ordinary skill in the art having reference to this description. In this context, the specification and figures are to be regarded in an illustrative rather than a restrictive sense, and all such modifications are intended to be included within the scope of this disclosure.

Those of skill will appreciate that the various illustrative logical blocks, modules, circuits, and algorithm steps described in connection with the embodiments disclosed herein may be implemented as electronic hardware, computer software (including firmware,) or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Those of skill in the art may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with application specific integrated circuits (ASICs), field programmable gate arrays (FPGAs), general purpose processors, digital signal processors (DSPs) or other logic devices, discrete gates or transistor logic, discrete hardware components, or any combination thereof designed to perform the functions described herein. A computer or general purpose processor may be any conventional processor, controller, microcontroller, state machine or the like. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in software (program instructions) executed by a processor, or in a combination of the two. The steps of the methods or algorithms herein are intended to be exemplary, and alternative embodiments may combine steps, split a single step into multiple steps, perform the steps in a different order, or have similar variations form the foregoing embodiments.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. A system for performing digital asset upload to conform with a target item, the system comprising:
   a server machine communicatively connected to a network;
   a client machine communicatively coupled to the server machine over the network;
   wherein the client machine receives user inputs, comprising selections of:
      a target item comprising a digital content item residing on the server machine characterized by target metadata;
      a plurality of digital assets to be associated with the target item and characterized by upload metadata; and
      a plurality of digital actions to be performed on the plurality of digital assets, one of
   the digital actions comprising conforming the upload metadata to the target metadata;
   the client machine uploading the digital assets to the server machine via the network; and
   the server machine performing the plurality of digital actions on the digital assets asynchronously from the client machine uploading of the digital assets, the digital actions performed against the selected target item.

2. The system of claim 1, wherein the plurality of digital assets comprises digital images, the upload metadata comprising the resolution of the digital assets, wherein:
   conforming of the upload metadata to the target metadata comprises:
      updating the upload metadata resolution of the digital assets based on the target metadata; and
   performing the plurality of digital actions comprises:
      changing the resolution of the digital assets according to the updated upload metadata resolution.

3. The system of claim 2, wherein the digital item of the target item comprises a background image, a thumbnail image, or a screen shot.

4. The system of claim 1, wherein the plurality of digital assets comprises videos, the upload metadata comprising video metadata of the digital assets, wherein:
   conforming of the upload metadata to the target metadata comprises:
      updating the video metadata of the upload metadata based on the target metadata; and
   performing the plurality of digital actions comprises:
      changing the video metadata of the digital assets according to the updated video metadata.

5. The system of claim 4, wherein the digital item of the target item comprises a video clip, an advertisement, or a video segment and the digital action comprises changing the format of the digital assets.

6. The system of claim 1, wherein the target item includes a plurality of selected target items, the system uploading a portion of the digital assets against one of the selected targets items and another portion of the digital assets against another one of the selected target items.

7. The system of claim 6, wherein one of the digital actions is performed against the portion of digital assets and another one of the digital actions is performed against another portion of the digital assets.

8. A method for performing digital asset upload to conform with a target item, comprising:
   at a client machine, the client machine connected to a network and communicatively coupled to a server machine over the network:
      receiving user inputs, comprising selections of:
         a target item comprising a digital content item residing on the server machine characterized by target metadata;
         a plurality of digital assets to be associated with the target item and characterized by upload metadata; and
         a plurality of digital actions to be performed on the plurality of digital assets, one of the digital actions comprising conforming the upload metadata to the target metadata; and
      uploading the digital assets to the server machine via the network; and
   at the server machine, performing the plurality of digital actions on the digital assets asynchronously from the client machine uploading of the digital assets, the digital actions performed against the selected target item.

9. The method of claim 8, wherein the plurality of digital assets comprises digital images, the upload metadata comprising the resolution of the digital assets, wherein:
   conforming of the upload metadata to the target metadata comprises:
      updating the upload metadata resolution of the digital assets based on the target metadata; and
   performing the plurality of digital actions comprises:
      changing the resolution of the digital assets according to the updated upload metadata resolution.

10. The method of claim 9, wherein the digital item of the target item comprises a background image, a thumbnail image, or a screen shot.

11. The method of claim 8, wherein the plurality of digital assets comprises videos, the upload metadata comprising video metadata of the digital assets, wherein:
   conforming of the upload metadata to the target metadata comprises:
      updating the video metadata of the upload metadata based on the target metadata; and
   performing the plurality of digital actions comprises:
      changing the video metadata of the digital assets according to the updated video metadata.

12. The method of claim 11, wherein the digital item of the target item comprises a video clip, an advertisement, or a video segment and the digital action comprises changing the format of the digital assets.

13. The method of claim 8, wherein the target item includes a plurality of selected target items, the system uploading a portion of the digital assets against one of the selected targets items and another portion of the digital assets against another one of the selected target items.

14. The method of claim 13, wherein one of the digital actions is performed against the portion of digital assets and another one of the digital actions is performed against the another portion of the digital assets.

15. A computer program product comprising at least one non-transitory computer-readable medium that stores one or more instructions that are executable by a computer to perform:

at a client machine, the client machine connected to a network and communicatively coupled to a server machine over the network:

receiving user inputs, comprising selections of:

a target item comprising a digital content item residing on the server machine characterized by target metadata;

a plurality of digital assets to be associated with the target item and characterized by upload metadata; and a plurality of digital actions to be performed on the plurality of digital assets, one of the digital actions comprising conforming the upload metadata to the target metadata; and uploading the digital assets to the server machine via the network; and at the server machine, performing the plurality of digital actions on the digital assets asynchronously from the client machine uploading of the digital assets, the digital actions performed against the selected target item.

16. The computer program product of claim 15, wherein the plurality of digital assets comprises digital images, the upload metadata comprising the resolution of the digital assets, wherein:

conforming of the upload metadata to the target metadata comprises:

updating the upload metadata resolution of the digital assets based on the target metadata; and performing the plurality of digital actions comprises:

changing the resolution of the digital assets according to the updated upload metadata resolution.

17. The computer program product of claim 16, wherein the digital item of the target item comprises a background image, a thumbnail image, or a screen shot.

18. The computer program product of claim 15, wherein the plurality of digital assets comprises videos, the upload metadata comprising video metadata of the digital assets, wherein:

conforming of the upload metadata to the target metadata comprises:

updating the video metadata of the upload metadata based on the target metadata; and performing the plurality of digital actions comprises:

changing the video metadata of the digital assets according to the updated video metadata.

19. The computer program product of claim 18, wherein the digital item of the target item comprises a video clip, an advertisement, or a video segment and the digital action comprises changing the format of the digital assets.

20. The computer program product of claim 15, wherein the target item includes a plurality of selected target items, the system uploading a portion of the digital assets against one of the selected targets items and another portion of the digital assets against another one of the selected target items.

21. The computer program product of claim 20, wherein one of the digital actions is performed against the portion of digital assets and another one of the digital actions is performed against the another portion of the digital assets.

* * * * *